United States Patent
Yang et al.

(10) Patent No.: US 11,152,874 B2
(45) Date of Patent: Oct. 19, 2021

(54) MULTI-SPOKE-TYPE ULTRASONIC MOTOR

(71) Applicant: NANJING UNIVERSITY OF AERONAUTICS AND ASTRONAUTICS, Nanjing (CN)

(72) Inventors: Ying Yang, Nanjing (CN); Piotr Vasiljev, Nanjing (CN); Dalius Mazeika, Nanjing (CN); Sergejus Borodinas, Nanjing (CN); Jianmin Qiu, Nanjing (CN); Xin Hong, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 294 days.

(21) Appl. No.: 16/480,218

(22) PCT Filed: Sep. 27, 2017

(86) PCT No.: PCT/CN2017/103728
§ 371 (c)(1),
(2) Date: Jul. 23, 2019

(87) PCT Pub. No.: WO2018/153091
PCT Pub. Date: Aug. 30, 2018

(65) Prior Publication Data
US 2020/0007052 A1  Jan. 2, 2020

(30) Foreign Application Priority Data
Feb. 23, 2017 (CN) .......................... 201710099331.9

(51) Int. Cl.
*H02N 2/16* (2006.01)
*H02N 2/00* (2006.01)
(Continued)

(52) U.S. Cl.
CPC ............. *H02N 2/163* (2013.01); *H02N 2/002* (2013.01); *H02N 2/0065* (2013.01); *H02N 2/103* (2013.01); *H02N 2/12* (2013.01)

(58) Field of Classification Search
CPC ...... H02N 2/163; H02N 2/0065; H02N 2/002; H02N 2/103; H02N 2/12
See application file for complete search history.

(56) References Cited

U.S. PATENT DOCUMENTS

| 5,051,647 A | 9/1991 | Uchikawa et al. |
| 6,628,046 B2 * | 9/2003 | Seki ...................... H02N 2/106 310/323.04 |
| 2001/0013740 A1 | 8/2001 | Fukui et al. |

FOREIGN PATENT DOCUMENTS

| CN | 101572507 A | 11/2009 |
| CN | 104821742 A | 8/2015 |

(Continued)

*Primary Examiner* — Emily P Pham
(74) *Attorney, Agent, or Firm* — Treasure IP Group, LLC

(57) ABSTRACT

A multi-spoke-type ultrasonic motor has: a rotating shaft (1), a fastening sleeve cylinder (2), a spring (3), a rotor (4), a stator (5), a fastening screw (6), and piezoelectric ceramics (7). The rotor (4), the stator (5), the spring (3), and the fastening sleeve cylinder (2) are sequentially connected via the rotating shaft (1). The stator (5) is an annular metal plate having internal spoke-like teeth. The upper surface and the lower surface of the stator (5) are provided with identical stator spoke-like teeth for contacting the rotor (4). The rotor (4) and the stator (5) are in close contact under the effect of prestressing of the spring (3). The piezoelectric ceramics (7) are annular plates; upper and lower plates respectively are affixed on the upper and lower surfaces of the stator (5). The motor is capable of increasing the output power of the ultrasonic motor.

9 Claims, 4 Drawing Sheets

(51) Int. Cl.
*H02N 2/12* (2006.01)
*H02N 2/10* (2006.01)

(56) References Cited

FOREIGN PATENT DOCUMENTS

| | | |
|---|---|---|
| CN | 105634324 A | 6/2016 |
| CN | 106059378 A | 10/2016 |
| CN | 107046380 A | 8/2017 |
| JP | 0345172 A | 2/1991 |

* cited by examiner

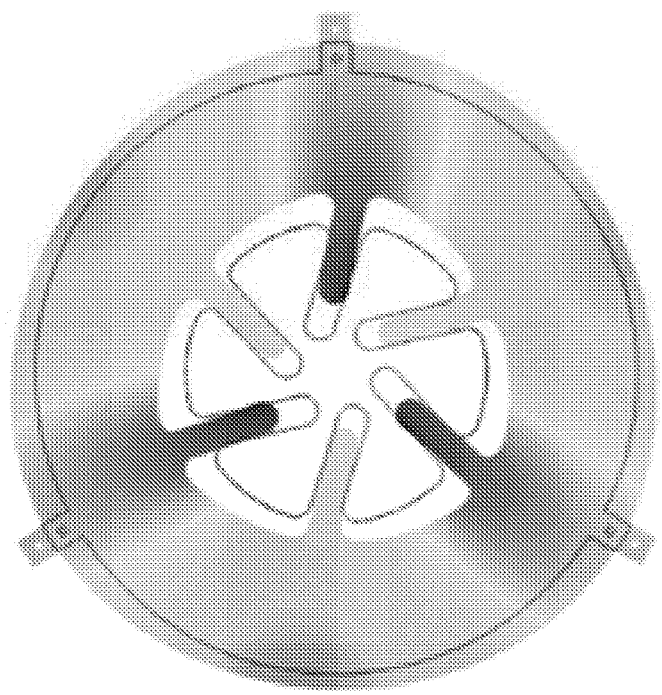
FIG. 5-A
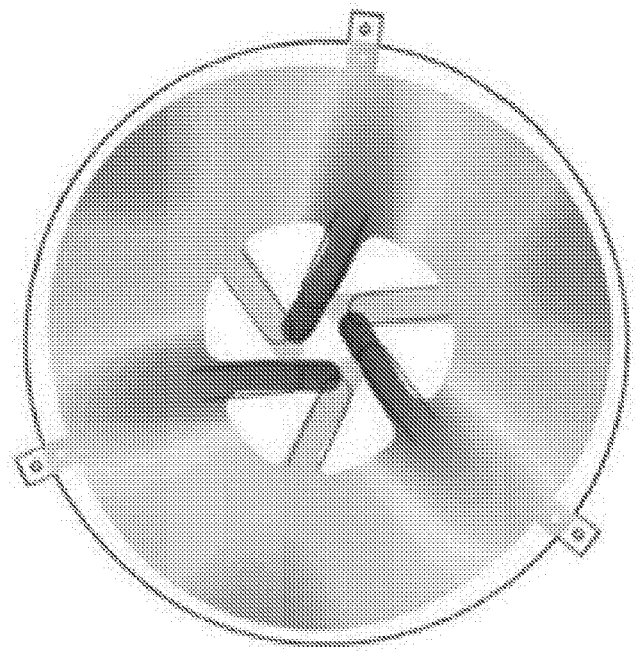
FIG. 5-B

MULTI-SPOKE-TYPE ULTRASONIC MOTOR

CROSS REFERENCE TO RELATED APPLICATION

This application claims priority to a PCT application PCT/CN2017/103728, filed on Aug. 30, 2018, which in turn takes priority of Chinese Application No. 201710099331.9 filed on Feb. 23, 2017. Both the PCT application and Chinese Application are incorporated herein by reference in their entireties.

BACKGROUND

Technical Field

The present invention relates to the technical field of ultrasonic motors, and in particular, to a multi-spoke-type ultrasonic motor.

Related Art

As a drive motor, a direct current motor is widely used, but with the decrease of the size, the Joule heat loss of the motor is sharply increased, and the drive capability of the motor is significantly decreased. An ultrasonic motor transforms electric energy into mechanical energy by using the inverse piezoelectric effect and the friction effect of a material. With the decrease of the size, mechanical performance of the motor is sluggishly decreased, and this helps miniaturization and microminiaturization of the motor. Existing travelling-wave ultrasonic motors have excellent output performance, but with the decrease of the space size of the motor, machining precision requirements for parts are increased rapidly. Reducing the machining precision requirements for parts by structure designing is main work of a current ultrasonic motor in the miniaturization aspect.

In the present invention, an internal ring provided with spatial rotational symmetrical teeth is used to form a stator, and in a work state of driving a hemispherical or tapered rotor by friction, the machining requirements for parts are reduced while the mechanical performance of the ultrasonic motor is increased.

SUMMARY OF THE INVENTION

Embodiments of the present invention provide a multi-spoke-type ultrasonic motor, to increase output performance of the ultrasonic motor, prolong service life, and reduce manufacturing costs.

To achieve the foregoing objective, the embodiments of the present invention use the following technical solutions:

An embodiment of the present invention provides a multi-spoke-type ultrasonic motor, including:

a rotating shaft (1), a fastening sleeve (2), a spring (3), a rotor (4), a stator (5), a fastening screw (6), and piezoelectric ceramics (7), where the rotor (4), the stator (5), the spring (3), and the fastening sleeve (2) are sequentially connected by using the rotating shaft (1); the fastening screw (6) is located in the middle of a side surface of the fastening sleeve, and the fastening screw (6) is adjusted to make the fastening sleeve (2) slide on the rotating shaft (1), to adjust a pre-pressure of the spring (3); the spring (3) is between the fastening sleeve (2) and the rotor (4), and is pressed on a surface of the rotor (4); the rotor (4) is hemispheric or tapered; the stator (5) is an annular metal sheet internally provided with spoke-like teeth, both an upper surface and a lower surface of the stator (5) are provided with identical spoke-like teeth for contacting the rotor (4), and the rotor (4) and the spoke-like teeth of the stator (5) are in close contact under the effect of the pre-pressure of the spring (3); and the piezoelectric ceramics (7) are annular sheets, and an upper sheet and a lower sheet are separately affixed to a surface of the stator (5).

In one implementation or embodiment, an angle between a central line of the internal spoke-like teeth of the stator (5) and a normal line of a contact position of a stator inner ring in which a tooth root is located is θ, and θ is designed based on requirement.

In another implementation or embodiment, the quantity of the internal spoke-like teeth of the stator (5) is designed based on a requirement, and the spoke-like teeth are rotationally symmetrical about a vertex being the circle center of the stator ring.

In another implementation or embodiment, there is an angle α between the internal spoke-like teeth and a plane in which the stator (5) is located, and the angle α is greater than 0° and less than 90°.

In another implementation or embodiment, the angle α is formed by bending the internal spoke-like teeth of the stator upward and downward separately from the tooth root to make the internal spoke-like teeth away from a plane in which a ring of the stator (5) is located.

In another implementation or embodiment, an outer ring of the stator (5) is provided with several hole fixing structures (10), evenly distributed on the outer ring of the stator (5).

In another implementation or embodiment, the surface (9) of the stator (5) is polished.

In another implementation or embodiment, the rotor (4) is manufactured by using the wear-resistant material.

In still another implementation or embodiment, the size of the inner diameter of the piezoelectric ceramic (7) is the same as the size of the outer ring surface of the stator (5), and both the upper sheet and the lower sheet of the piezoelectric ceramics are polarized along the direction of the thickness and have opposite polarization directions.

In yet another implementation or embodiment, when the motor is in a work state, the electrode applies the same electric excitation signal to the exposed part of the upper sheet and the lower sheet of the piezoelectric ceramics (7), and the electric excitation signal is a sinusoidal wave signal.

The multi-spoke-type ultrasonic motor provided by the embodiments of the present invention has better performance at the output torque and the output rotating speed, a simple and compact structure, low machining precision dependence, a low drive voltage, a simple excitation manner, low manufacturing costs, and a stable and reliable output, and is suitable for large-scale industrial applications. The multi-spoke-type ultrasonic motor may be applied to a micro helicopter motor, and a zoom system of a micro electronic device, such as a capsule endoscope, an electronic eyeball, a digital single lens reflex, or a smartphone. The embodiments of the present invention have broad application prospects in scientific and technological fields of robotics, medical instruments, micromechanics, and aeronautics and astronautics.

BRIEF DESCRIPTION OF THE DRAWINGS

To describe the technical solutions of the embodiments of the present invention more clearly, the following briefly introduces the accompanying drawings required for the embodiments. Apparently, the accompanying drawings in the following description show merely some embodiments of the present invention, and a person of ordinary skill in the prior art may still derive other drawings from these accompanying drawings without creative efforts.

FIG. 1 is a schematic structural diagram of a multi-spoke-type ultrasonic motor according to an embodiment of the present invention;

FIG. 5-A is a schematic diagram of the expansion mode when the work mode of a multi-spoke-type ultrasonic motor stator vibrates radially according to an embodiment of the present invention; and FIG. 5-B is a schematic diagram of the contraction mode when the work mode of a multi-spoke-type ultrasonic motor stator vibrates radially according to an embodiment of the present invention.

DETAILED DESCRIPTION OF EMBODIMENTS

To make a person skilled in the art better understand the technical solutions of the present invention, the following further describes the present invention in detail with reference to the accompanying drawings and specific implementations. The following describes implementations of the present invention in detail, and examples of the implementations are shown in the accompanying drawings, where reference numbers that are the same or similar from beginning to end represent same or similar components or components that have same or similar functions. The following implementations described with reference to the accompanying drawings are exemplary, which are used only to explain the present invention, and cannot be construed as a limitation to the present invention.

A person skilled in the art may understand that, unless defined otherwise, all terms (include technical terms and scientific terms) used herein have same meanings as common understandings of a person of ordinary skill in the art of the present invention. It should be further understood that, the terms defined in a universal dictionary are understood to have meanings same as meanings in a context in the prior art, and are not explained by using idealized or overly formal meanings unless defined like here.

Embodiments of the present invention provide a multi-spoke-type ultrasonic motor, to increase output performance of the ultrasonic motor, prolong service life, and reduce manufacturing costs.

Figure 1:
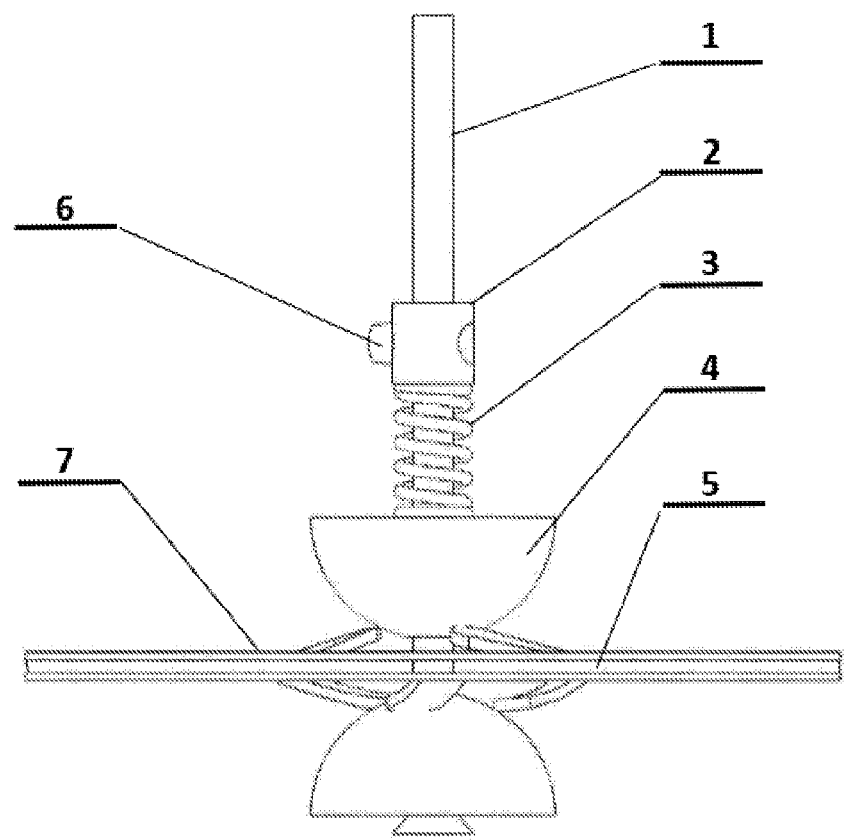

To achieve the foregoing objective, the embodiments of the present invention use the following technical solutions:

As shown in FIG. 1, an embodiment of the present invention provides a multi-spoke-type ultrasonic motor, including: a rotating shaft (1), a fastening sleeve (2), a spring (3), a rotor (4), a stator (5), a fastening screw (6), and piezoelectric ceramics (7), where the rotor (4), the stator (5), the spring (3), and the fastening sleeve (2) are sequentially connected by using the rotating shaft (1); the fastening screw (6) is located in the middle of a side surface of the fastening sleeve, and the fastening screw (6) is adjusted to make the fastening sleeve (2) slide on the rotating shaft (1), to adjust a pre-pressure of the spring (3); the spring (3) is between the fastening sleeve (2) and the rotor (4), and is pressed on a surface of the rotor (4); the rotor (4) is hemispheric or tapered; the stator (5) is an annular metal sheet internally provided with spoke-like teeth, both an upper surface and a lower surface of the stator (5) are provided with identical spoke-like teeth for contacting the rotor (4), and the rotor (4) and the spoke-like stator (5) are in close contact under the effect of the pre-pressure of the spring (3); and the piezoelectric ceramics (7) are flat annular sheets, and an upper sheet and a lower sheet separately are affixed to an annular surface of the stator (5).

In an implementation, the quantity of the internal spoke-like teeth of the stator (5) is designed based on a requirement, and the spoke-like teeth are rotationally symmetrical about a vertex being the circle center of the stator ring.

The size of the inner diameter of the piezoelectric ceramic (7) is the same as the size of the outer ring surface of the stator (5), and both the upper sheet and the lower sheet of the piezoelectric ceramics are polarized along the direction of the thickness and have opposite polarization directions.

When the ultrasonic motor is in a work state, the upper sheet and the lower sheet of the piezoelectric ceramics (7) apply a same sinusoidal electric signal by using the electrode, to excite the stator to vibrate, and the spoke-like teeth of the stator drive the rotor to rotate.

In this embodiment of the present invention, a first-order radial vibration mode of the motor stator (5) is used as the work mode. By using the first-order radial vibration mode of the stator (5), the internal spoke-like teeth of the stator (5) obtain a relatively large displacement, and the rotor (4) is driven by using the friction effect.

Figure 2:
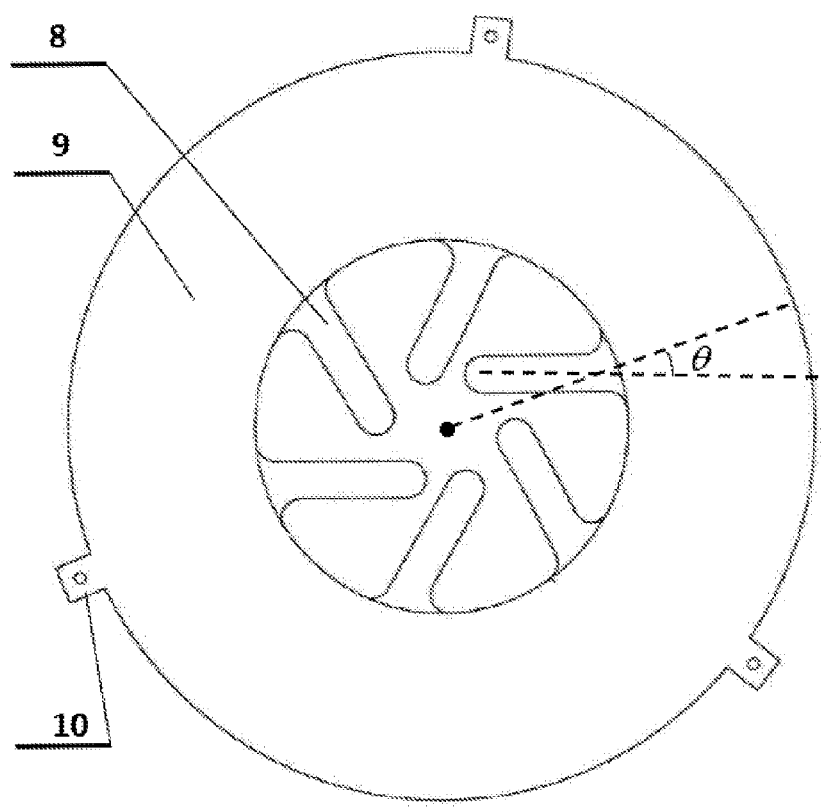
FIG. 2 is a schematic structural diagram of a stator of a multi-spoke-type ultrasonic motor according to an embodiment of the present invention.

In an implementation, as shown in FIG. 2, position of contact between the rotor (4) and the stator (5) is on the internal spoke-like tooth surface (8) of the annular stator; and the angle between central line of the internal spoke-like teeth of the stator (5) and normal line of the contact position of the stator inner ring in which the tooth root is located is θ, and θ can be designed based on requirement.

In an implementation, the quantity of the internal spoke-like teeth of the stator (5) is designed based on requirement, and the spoke-like teeth need to be symmetrical about the center.

Preferably, as shown in FIG. 2, the quantity of the internal spoke-like teeth of the stator (5) is 6, evenly distributed at the stator inner ring, the spoke-like teeth (8) whose angle on a planar projection of the stator ring is 120° are a group, and there are a total of two groups.

Figure 3:
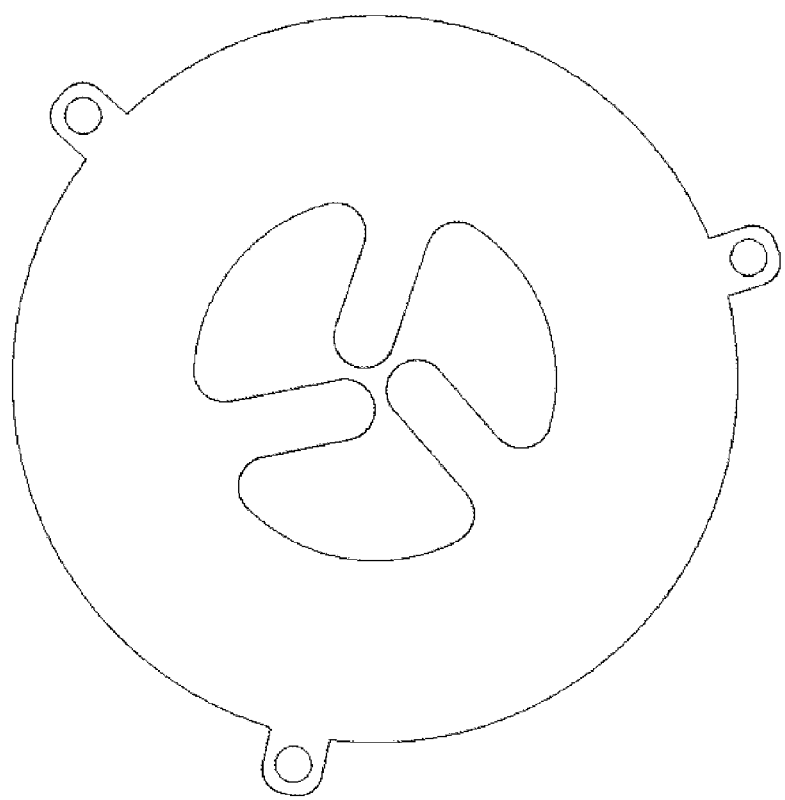
FIG. 3 is a schematic structural diagram of another stator of a multi-spoke-type ultrasonic motor according to an embodiment of the present invention.

The internal spoke-like teeth of the stator (5) of the ultrasonic motor provided by this embodiment of the present invention may be in another quantity, but need to be ensured to be rotationally symmetrical about the center. As shown in FIG. 3, the quantity of the internal spoke-like teeth of the stator is 3, and technical effects brought by different quantities of spoke-like teeth are also different. In this embodiment of the present invention, if there are three internal spoke-like teeth, the motor can obtain a relatively high output rotating speed; and if there are six internal spoke-like teeth, the motor can obtain relatively large output torque.

In this embodiment of the present invention, the output rotating speed and torque of the motor may be controlled by changing value of θ.

Figure 4:
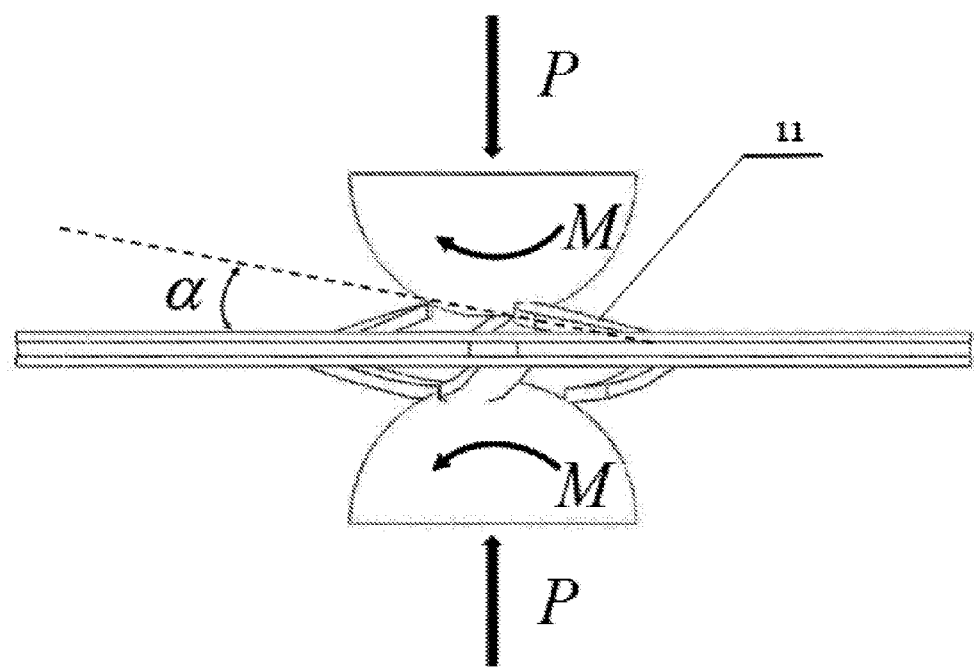
FIG. 4 is a schematic operating diagram of a multi-spoke-type ultrasonic motor according to an embodiment of the present invention.

In an implementation, as shown in FIG. 4, the stator (5) is an annular metal sheet internally provided with spoke-like teeth, there is an angle α between the internal spoke-like teeth and a plane in which the stator (5) is located, and the angle α is greater than 0° and less than 90°.

In a preferred solution, the angle α is greater than 0° and less than or equal to 45°.

In an implementation, the quantity of the internal spoke-like teeth of the stator (5) is designed based on requirement, and the spoke-like teeth are rotationally symmetrical about a vertex being the circle center of the stator ring.

In an implementation, the angle α is formed by bending the internal spoke-like teeth of the stator upward and downward separately from the tooth root to make the internal spoke-like teeth away from a plane in which a ring of the stator (5) is located.

As shown in FIG. 4, when the motor is operating, P is a spring pre-pressure, and M is drive torque. The angle α is shown in FIG. 4. In this embodiment, beneficial effects brought by using the design of the angle α are as follows.

First, the design of the angle may fully use vibration energy of the stator, optimize contact between the stator and the rotor, and increase output torque and a rotating speed of the motor.

Second, because when the motor works, long-time contact friction may wear down the spoke-like teeth of the stator, upper and lower rotors are in contact with each other to reduce output efficiency of the motor, and the design of the angle can avoid this situation, and greatly prolong service life of the motor.

Third, the design of the angle has a spring effect, and the angle may replace a pre-pressure spring in a micro motor system, and reduce space.

Fourth, the design of the angle makes the motor rotor receive stable three-point support, to weaken shaking of the rotating shaft during rotating, and make the motor operate stably.

Based on a design requirement, a value a of the angle is:

$$0° \leq \alpha \leq 90°.$$

When the stator (5) is in a work mode, as shown in FIG. 5-A, which is a schematic diagram of an expansion mode when a work mode of a multi-spoke-type ultrasonic motor stator vibrates radially according to an embodiment of the present invention; and as shown in FIG. 5-B, which is t a schematic diagram of a contraction mode when a work mode of a multi-spoke-type ultrasonic motor stator vibrates radially according to an embodiment of the present invention, a very large radial displacement may be obtained by movement of the internal spoke-like teeth of the stator (5).

There is $$t_A - t_B = \frac{T}{2}$$

in a period T of a vibration mode, where a time interval of the stator in a contraction mode and an expansion mode is a half period.

To increase the displacement of the spoke-like teeth at the inner ring of the stator, in the present invention, the spoke-like teeth are optimized, and by changing its length, a first-order longitudinal vibration mode frequency of the spoke-like teeth is equal to a first-order radial vibration mode frequency of the stator.

In an implementation, as shown in FIG. 2, the outer ring of the stator (5) is provided with three square hole fixing structures (10), evenly distributed on the outer ring of the stator (5).

In an implementation, the surface (9) of the stator (5) is polished.

To better affix the piezoelectric ceramics (7) and the stator (5), and make an adhesive surface electrode of the piezoelectric ceramic and a stator substrate be conducted, the surface (9) of the stator is polished.

In an implementation, the rotor (4) is manufactured by using the wear-resistant material.

In an implementation, the size of the inner diameter of the piezoelectric ceramic (7) is the same as the size of the outer ring surface of the stator (5), and both the upper sheet and the lower sheet of the piezoelectric ceramics are polarized along the direction of the thickness and have opposite polarization directions. Both an upper sheet and a lower sheet of the piezoelectric ceramics are polarized along the direction of the thickness and have opposite polarization directions, and this facilitates wiring. In this embodiment, only one channel of signal needs to be used to complete electric excitation.

In an implementation, when the motor is in a work state, the electrode applies a same electric excitation signal to the exposed part of the upper sheet and the lower sheet of the piezoelectric ceramics (7), and the electric excitation signal is a sinusoidal wave.

The multi-spoke-type ultrasonic motor provided by the embodiments of the present invention has better performance at the output torque and the output rotating speed, a simple and compact structure, low machining precision dependence, a low drive voltage, a simple excitation manner, low manufacturing costs, and a stable and reliable output, and is suitable for large-scale industrial applications. The multi-spoke-type ultrasonic motor may be applied to a power plant of a micro aerial vehicle; a microelectronic and medical device such as a driver of a capsule endoscope; and a zoom system of a micro electronic device, such as a capsule endoscope, an electronic eyeball, a digital single lens reflex, or a lens of a smartphone.

The embodiments of the present invention have broad application prospects in scientific and technological fields of robotics, medical instruments, micromechanics, and aeronautics and astronautics.

It should be noted that the embodiments in this specification are all described in a progressive manner. Reference may be made to each other for the same or similar parts among respective embodiments, and description of each of the embodiments focuses on differences from other embodiments. Particularly, the device embodiments are substantially similar to the method embodiments and therefore are only briefly described, and reference may be made to the method embodiments for the associated part.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the appended claims.

What is claimed is:

1. A multi-spoke-type ultrasonic motor, comprising: a rotating shaft (1), a fastening sleeve (2), a spring (3), a rotor (4), a stator (5), a fastening screw (6), and piezoelectric ceramics (7), wherein the rotor (4), the stator (5), the spring (3), and the fastening sleeve (2) are sequentially connected by using the rotating shaft (1); the fastening screw (6) is located in the middle of a side surface of the fastening sleeve, and the fastening screw (6) is adjusted to make the fastening sleeve (2) slide on the rotating shaft (1), to adjust a pre-pressure of the spring (3); the spring (3) is between the fastening sleeve (2) and the rotor (4), and is pressed on a surface of the rotor (4); the rotor (4) is hemispheric or tapered; the stator (5) is an annular metal sheet internally provided internal spoke-like teeth, both an upper surface and a lower surface of the stator (5) are provided with identical spoke-like teeth for contacting the rotor (4), and the rotor (4) and the spoke-like teeth of the stator (5) are in close contact under the effect of the pre-pressure of the spring (3); and the piezoelectric ceramics (7) are flat annular sheets, and an upper sheet and a lower sheet are separately affixed to an annular surface of the stator (5), wherein there is an angle between the internal spoke-like teeth of the stator (5) and a stator ring surface on which a tooth root is located, and the internal spoke-like teeth of the stator (5) are rotationally symmetrical about a center of the stator ring surface.

2. The multi-spoke-type ultrasonic motor according to claim 1, wherein a size of an inner diameter of the piezoelectric ceramic (7) is the same as the size of an outer ring surface of the stator (5), and both the upper sheet and the lower sheet of the piezoelectric ceramics are polarized along the direction of the thickness and have opposite polarization directions.

3. The multi-spoke-type ultrasonic motor according to claim 1, wherein when the ultrasonic motor is in a work state, the upper sheet and the lower sheet of the piezoelectric ceramics (7) apply a same sinusoidal electric signal by using the electrode, to excite the stator to vibrate, and the spoke-like teeth of the stator drive the rotor to rotate.

4. The multi-spoke-type ultrasonic motor according to claim 1, wherein the stator (5) is an annular metal sheet internally provided with spoke-like teeth, there is an angle $\alpha$ between the internal spoke-like teeth and a plane in which the stator (5) is located, and the angle $\alpha$ is greater than 0° and less than 90°.

5. The multi-spoke-type ultrasonic motor according to claim 1, wherein the angle $\alpha$ is greater than 0° and less than or equal to 90°.

6. The multi-spoke-type ultrasonic motor according to claim 1, wherein there is an angle between the internal spoke-like teeth and a plane in which the stator (5) is located, and the angle $\alpha$ is formed by bending the internal spoke-like teeth of the stator upward and downward separately from the tooth root to make the internal spoke-like teeth away from a plane in which a ring of the stator (5) is located.

7. The multi-spoke-type ultrasonic motor according to claim 1, wherein an outer ring of the stator (5) is provided with several hole fixing structures (10), evenly distributed on the outer ring of the stator (5).

8. The multi-spoke-type ultrasonic motor according to claim 2, wherein the surface (9) of the stator (5) is polished;
   the quantity of the internal spoke-like teeth of the stator (5) is 3; or
   the quantity of the internal spoke-like teeth of the stator (5) is 6; or
   the quantity of the internal spoke-like teeth of the stator (5) is n, wherein n≥3.

9. The multi-spoke-type ultrasonic motor according to claim 1, wherein when the motor is in a work state, the electrode applies a same electric excitation signal to the exposed part of the upper sheet and the lower sheet of the piezoelectric ceramics (7), and the electric excitation signal is a sinusoidal wave.

* * * * *